3,277,217
PROCESS FOR PRODUCING PHOSPHATE ESTERS BY OXIDATION OF PHOSPHITES USING HYDROGEN PEROXIDE AND ORGANIC PEROXIDES AS CATALYST
Louis J. Nehmsmann III, and Leslie G. Nunn, Jr., Metuchen, and Leslie M. Schenck, Mountainside, N.J., assignors to General Aniline & Film Corporation, New York, N.Y., a corporation of Delaware
No Drawing. Filed Apr. 24, 1963, Ser. No. 275,222
10 Claims. (Cl. 260—985)

This invention relates to the production of organic phosphate esters and more particularly to an improved process for the preparation of phosphate esters of hydroxylic organic compounds.

Organic phosphate esters have previously been previously been prepared by esterifying hydroxylic organic compounds with a number of different phosphating agents including $H_3PO_4$, $P_2O_5$, $POCl_3$ and the like. When organic phosphate esters have been desired, $POCl_3$ has been the preferred phosphating agent. However, the use of $POCl_3$ as a phosphating agent in some instances has been subject to a number of procedural disadvantages or has failed to produce esters of reproducible quality in satisfactory yield. Generally, the desired phosphation reaction has been accompanied by side reactions which have produced other unwanted products or unwanted byproducts such as HCl are produced by the phosphation reaction itself. These byproducts, particularly HCl have often entered into side reactions to cause further complications. Frequently purification steps such as distillation, recrystallization and other separation methods have been required to obtain the desired phosphate esters of acceptable quality. Where purification has been possible, it has increased the cost of manufacture as well as reduced the yield of the ester. For example, yields of 71 to 75% have been reported for a tri-n-butyl phosphate in Organic Syntheses II, 109 (John Wiley & Sons, N.Y. 1943). The product was obtained by reaction of butyl alcohol with $POCl_3$ using pyridine as an HCl acceptor and was purified by solvent extraction followed by distillation.

However, it has not been possible to purify certain phosphate esters because their physical and chemical properties do not permit use of purification methods such as extraction, distillation and recrystallization. Furthermore, HCl acceptors cannot be readily used in syntheses where the product cannot be subjected to further purification. Complications have also arisen where the esters undergo chemical changes such as decomposition, polymerization and rearrangement during processing particularly in the purification step. Use of $POCl_3$ as a phosphation agent has in effect been limited to preparation of those esters whose properties permit further purification.

Anther method for preparation of phosphate esters is the oxidation of phosphite esters. Direct oxidation of trisubstituted phosphites with air or oxygen is well known. Zimmermann in Ann. 175, 1 (1875) oxidized triethyl phosphite to triethyl phosphate by passing air through the phosphite for 71 days. Other workers have used chemical oxidizing agents instead of oxygen in an effort to shorten the time period requirements of the air oxidation method. Cox and Westheimer in J. Am. Chem. Soc. 80, 5441 (1958) reviewed the various known methods and reported none was completely satisfactory. The known methods failed to give the satisfactory yields, produced significant amounts of side reaction products, hydrolyzed trisubstituted phosphates to disubstituted phosphates or created other complications. These workers found that dinitrogen tetroxide oxidizes trisubstituted phosphites to the corresponding phosphates in 70–87% yields in methylene chloride as a solvent at Dry Ice temperatures with the oxidizing agent being reduced to a mixture of $N_2O$ and $N_2$. Although the $N_2O_4$ method eliminated the need for removal of byproducts produced from reduction of the oxidant, the product still contained solvent and unreacted trisubstituted phosphite so purification of the trisubstituted phosphate was still required.

It is an object of this invention to provide an improved process for producing organic phosphate esters from the corresponding phosphites which will yield substantially pure phosphate esters that will require little if any further purification. Another object of this invention is to provide a process which will not require the use of solvents. A further object of the invention is to provide a process which will operate within normal time cycles and reasonable temperatures. Still another object of this invention is to reduce the required amount of oxidizing agents other than air and elemental oxygen and thereby practically eliminate the problems created by the presence of unwanted side reaction products and reaction byproducts produced by these oxidizing agents. Other objects and advantages will appear as the description proceeds.

The attainment of the above objects is made possible by our discovery that phosphites are quantitatively oxidized to phosphates within normal time cycles at reasonable temperatures by use of elemental oxygen or air in the presence of a small or catalytic amount of a peroxide compound selected from the group consisting of hydrogen peroxide, organic peroxides containing alkyl groups, organic peroxides containing aromatic groups and organic peroxides containing alicylic groups. More particularly, our invention includes a process comprising reacting elemental oxygen with at least one phosphite ester selected from the group corresponding to the general formula:

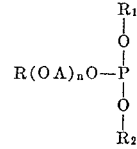

wherein R represents a member selected from the group consisting of alkyl, alkylene and aryl radicals, A represents an alkylene group containing from 2 to 4 carbon atoms and $n$ represents an integer including 0 of from 0 to 150, $R_1$ and $R_2$ each represents a member of the group consisting of hydrogen, alkyl, alkylene and aryl radicals and the group R—(OA)$n$— wherein R, A and $n$ are as defined above, at a temperature of from 25° to 200° C. in the presence of a small amount of one or a mixture of the aforementioned peroxide compounds.

The process of the present invention is particularly advantageous for the production of trisubstituted phosphates by oxidation of the corresponding trisubstituted phosphites and will therefore first be described in connection with the preparation of trisubstituted phosphates.

By the use of such peroxide compounds in accordance with the present invention in the oxidation of phosphites, an unexpected and substantial improvement has been found in the yields and quality of the products. The yields were quantitative as compared to those of 70 to 80% previously reported in the literature. The quality of products produced by our invention was excellent. We were unable to detect even traces of unreacted trisubstituted phosphites or byproducts such as mono and di substituted phosphates in products produced by our invention where earlier workers reported separations of phosphites were necessary and further purification was required to obtain trisubstituted esters free of unwanted byproducts such as mono and disubstituted phosphates. Furthermore, our products were not contaminated with the byproducts and side reaction products resulting from the use of stoichiometric and larger quantities of oxidizing agents other than oxygen or air which were obtained by the prior art and had to be removed to produce products of high purity. Our invention does not require the use of solvents or their removal. Our invention also results in time cycles of 1 to 40 hours at temperatures of 25° to 200° C. whereas time cycles as long as 71 days have been reported in the literature. This invention also has the further advantage that phosphate esters which previously could not be prepared in high purity because their physical and chemical properties did not permit purification can now be prepared directly in high purity without purification being required.

Briefly stated, many of the phosphites which may be employed in our invention are well known in the art and are disclosed along with suitable methods for their preparation in numerous patents and other publications. Specific examples include trimethyl phosphite, triethyl phosphite, tris (2-chloroethyl) phosphite, triisopropyl phosphite, tributyl phosphite, triisoamyl phosphite, triisooctyl phosphite, tris (2-ethylhexyl) phosphite, di (2-ethylhexyl) octylphenyl phosphite, trioctylphenyl phosphite, diphenyl propyl phosphite, diphenyl butyl phosphite, triphenyl phosphite, tris (4-chlorophenyl) phosphite, tricresyl phosphite, tris (2-phenylphenyl) phosphite, tri-o-cyclohexylphenyl phosphite, tris (2-naphthyl) phosphite, trinonyl phosphite, trilauryl phosphite, tristearyl phosphite and the like.

Still another group of phosphites that may be employed in the present invention are those disclosed in the copending application of Schenck, Leary, and Nunn, Serial No. 333,701 filed December 26, 1963. These phosphites are derived from alkanols obtained by condensing at least one mole of ethylene oxide with an organic compound containing an active hydrogen. If desired the organic compound may be condensed with at least one mole of an alkylene oxide such as propylene oxide or butylene oxide prior to condensation with ethylene oxide. Many of these alkanols are useful as nonionic surfactants (surface active agents) which are well known in the art and are disclosed along with suitable methods for their preparation in numerous patents and other publications. As such compounds containing a reactive hydrogen atom, there may be mentioned alcohols, phenols, thiols, primary and secondary amines, carboxylic and sulfonic acids and their amides. The amount of alkylene oxides or their equivalent condensed with the reactive hydrogen-containing compound, i.e. the length of the polyalkylene chain, will depend primarily on the particular compound with which it is condensed. As a convenient rule of thum, an amount of alkylene oxides or their equivalent should be employed to which will result in a condensation product containing about 20 to 80% by weight of combined alkylene oxide or alkylene oxides. However, the optimal amount of alkylene oxide required to attain the desired hydrophobic-hydrophilic balance in any particular instance may be determined by preliminary tests or routine experimentation.

A preferred group of nonionic surfactants which may be used as alkanols in preparation of phosphites for use in our invention are those derived from alkyl phenolic compounds. Numerous compounds of this group, i.e. polyalkylene oxide derivatives of phenolic compounds containing one or more alkyl substituents are described in U.S. Patent 2,213,477 and 2,593,112. Those preferred are the polyalkylene oxide derivatives of alkyl phenolic compounds in which the total number of alkyl carbon atoms in the alkyl phenolic compound is from 1 and 24 carbon atoms. As examples of such phenolic compounds, there may be mentioned normal and isomeric butyl, amyl, dibutyl and diaryl phenols and cresols, tripropyl and tributylphenols and cresols, heptyl, octyl, nonyl, decyl, undecyl, dodecyl, tetradecyl, hexadecyl, octadecyl and the like phenols as well as dihexyl, and trihexyl phenol prepared from hexene-1 and phenol, diisoheptylphenol, dioctylphenol, dinonylphenol, didecyl-p-cresol, didodecyl phenol and the like. Of particular value are the polyalkylene oxide derivatives of secondary and tertiary alkyl phenols and cresols prepared by condensing olefins of the type obtained in petroleum refining with phenols and cresols. The polyalkylene oxide derivatives of secondary alkyl phenols obtained by condensing phenols or cresols with α-olefins of the type obtained by either condensing ethylene in the presence of Ziegler type catalysts or wax cracking techniques are also of value. In the case of products obtained by condensing phenol or cresol with olefins of from 3 to 5 carbon atoms such as propylene, butylene or amylene, it is sometimes desirable to employ the dialkylated or trialkylated derivatives of phenols and cresols while in the case of compounds obtained by condensing a phenol or cresol with an α-olefin containing 6 or more carbon atoms, the mono-substituted derivatives are sometimes preferred. The α-olefins obtained from petroleum may contain either odd number and even number carbon atoms which is advantageous in many applications. They may also be used as mixtures having various ranges of carbon atoms such as $C_6$–$C_7$, $C_7$–$C_9$, $C_9$–$C_{11}$, $C_{11}$–$C_{15}$, $C_{15}$–$C_{20}$ and higher. Olefins containing even numbers of carbon atoms obtained from fats may also be used.

Particularly valuable derivatives may be obtained by alkylating phenols with olefins containing 8 to 18 carbon atoms such as octene, dodecene, pentadecene, octadecene, their isomers and mixtures thereof. These olefins may be obtained from polymerization of low molecular weight olefins such as propylene, butylene, amylene and their mixtures. Phenol it self may also be used to prepare useful polyalkylene oxide derivatives.

Another preferred group of organic compounds for the preparation of polyalkylene oxide derivatives for use in the synthesis of phosphites are those obtained by reaction of alkylene oxides with alcohols containing from 1 to 22 carbon atoms. These alcohols include methyl, ethyl, propyl, butyl, amyl, hexyl, heptyl, octyl, decyl, dodecyl, tetradecyl, hexadecyl, octadecyl, docosyl, isomers of these alcohols, their mixtures and the like. Of particular interest are a new class of synthetic alcohols prepared by polymerization of ethylene with Ziegler type catalysts to produce metal alkyls which in turn are converted to linear chain alcohols such as hexyl, octyl, decyl, octadecyl, higher alcohols and mixtures of these alcohols. Representative members of this class of alcohols are available under the trade name of Alfols (Continental Oil Company).

Condensation products of at least one mole of ethylene oxide with one mole of multi-branched chain primary aliphatic alcohol having the configuration of an alcohol produced by the Oxo process from a polyolefin having at least 7 carbon atoms may also be employed in the preparation of phosphites for use in our invention. Such alcohols may be prepared by the catalytic reaction of a polyolefin such as tripropylene, tetrapropylene, pentapropylene, diisobutylene, tetraisobutylene, propylene-isobutylene, tributene and the like with carbon monoxide and hydrogen to form an aldehyde followed by reduction of this aldehyde to a primary alcohol. This two step process is well known as the Oxo process and alcohols produced by this process are commonly known as Oxo alcohols. One of the preferred alcohols of this type is Oxo tridecyl alcohol produced from tetrapropylene or triisobutylene. Condensation products of one mole of these alcohols with at least one mole of ethylene oxide give alkanols which are partciularly valuable in the preparation of trisubstituted phosphites useful in the practice of our invention.

Trisubstituted phosphites prepared from oleyl alcohol and oleyl alcohol alkoxylates in which the terminal hydroxyl is obtained by reaction with oleyl alcohol with ethylene oxide are also of particular value in the practice of our invention. Other unsaturated alcohols such as allyl alcohol and erucyl alcohol may also be used.

Examples of trisubstituted phosphites of the above alkylene oxide derivatives which may be used in the practice of this invention are listed below. In this list, E.O. means ethylene oxide, likewise Pr. O. means propylene oxide and Bu. O. means butylene oxide, and the number preceding the same refers to the number of moles thereof reacted with one mole of the given active hydrogen containing organic hydroxylic compound. Although the three substituents shown in each of these examples are alike, this is to simplify presentation and does not preclude the possibility that all or two of the substituents may be different and that one or two substituents may be hydrogen.

tri(nonylphenol + 9 E.O.)$_3$P
tri(nonylphenol + 5 E.O.)$_3$P
tri(oleyl alcohol + 7 E.O.)$_3$P
tri(methyl alcohol + 1 E.O.)$_3$P
tri(octadecylphenol + 150 E.O.)$_3$P
tri(o-cresol + 2 Bu. O. + 1 E.O.)$_3$P
tri(dodecylphenol + 6 Pr. O. + 1 E.O.)$_3$P
tri(dodecyl alcohol + 3.5 E.O.)$_3$P
tri(tridecyl alcohol + 4 E.O.)$_3$P
tri(octadecyl alcohol + 20 E.O.)$_3$P
tri(dinonylphenol + 11 E.O.)$_3$P In carrying out the reaction in accordance with this invention, the desired amount of peroxide catalyst is mixed with the phosphite ester in the presence of oxygen or air at the desired temperature and sufficient oxygen or air added to oxidize the phosphite to the corresponding phosphate. If the phosphite is a solid, it should be reacted above its melting point. The reaction mixture may be agitated mechanically or by bubbling air or oxygen through it. Generally it is desirable to use mechanical agitation in addition to bubbling as heat transfer is improved. If desired, the reaction may be carried out under oxygen or air pressure in a closed system by introducing sufficient air or oxygen to maintain the desired pressure. If time is of the essence, the reaction may be carried out at elevated temperatures and pressures as these conditions increase the reaction rate and reduce the time required for reaction.

Amounts of peroxide from 0.1 to 0.008 mole per mole of phosphite have been found to be effective but in general we prefer to use from 0.1 to 0.05 mole of peroxide per mole of phosphite.

Since the reaction requires one gram atom of oxygen per mole of phosphite, the minimal oxygen concentration is fixed. In general oxygen concentrations in excess of the minimum amount required are used, particularly where it is desirable to carry out the reaction under pressure or where the reaction is being carried out at atmospheric pressure and recycling of oxygen or air is not feasible. Use of oxygen concentrations in excess of the stoichiometric amounts required may facilitate process operations but do not affect ultimate oxygen consumption. For this reason the amount of excess oxygen used should not be considered to be critical. Furthermore, it is possible to use an inert gas such as nitrogen to produce the desired pressure and to introduce oxygen under pressure particularly where close control over the oxygen concentration in the reaction mixture is desired. In most instances satisfactory results are obtained by introducing the required amount of oxygen in the form of either elemental oxygen or its equivalent in the form of air at pressures between atmospheric and 760 mm. Hg gauge. Air, oxygen and other gases used in the reaction should be dry because moist gases will introduce unwanted water into the reaction mixture which may cause hydrolysis of phosphate esters.

It is usually advantageous to carry out the reaction at temperatures in the range of 25° to 200° C. Temperatures below this range tend to give reaction rates that are too slow for most practical purposes. Some of the phosphite esters are heavy viscous liquids below 25° C. so it is desirable to react them at temperatures of 25° C. or above where they have more favorable viscosities. Temperatures above 200° C. tend to produce side reactions such as oxidation of the organic substituents to produce unwanted byproducts. Appreciable darkening and decomposition of the products may also occur at temperatures above 200° C. In general, temperatures in the range of 100° to 150° C. are preferred.

Addition of oxygen or air is continued at the desired temperature until reaction is complete. Reaction is usually complete within 1 to 40 hours but normally reaction conditions which give complete reaction within 6 to 14 hours are preferred. Completion of reaction may be determined by the usual analytical methods well known to those skilled in the art. For example, unreacted phosphites may be determined by iodometric titration. The percent of phosphorus in the product may be determined by one of the well established methods. If the phosphate ester has a definite boiling point or melting point, this physical constant may be determined. If the phosphate ester can not be distilled or recrystallized a variety of indirect analytical methods such as ion exchange or spectrophotometry are available. Since trisubstituted phosphates do not react with ion exchange resins but mono and disubstituted phosphates react with these resins, the amount of trisubstituted phosphate in the reaction mixture may be analyzed by passing the mixture through an ionic exchange resin column to remove mono and disubstituted phosphates and determining the percent of trisubstituted phosphate ester passing through the column. The presence of hydroxylic compounds in trisubstituted esters may be determined by infrared spectrum. Presence of hydroxylic compounds indicates hydrolysis has occurred. Combinations of these various analytical methods may be used to determine the quality of the phosphate ester produced. When phosphate esters based on surfactants are used, their quality may also be controlled by physical and application tests normally used by surfactant chemists.

Peroxides which may be employed as catalysts in this invention include hydrogen peroxide and organic peroxides. Organic peroxides may include diacyl aromatic peroxides such as dibenzoyl peroxide, di-[2,4-dichlorobenzoyl] peroxide, and di-[p-chlorobenzoyl] peroxide, diacyl aliphatic peroxides such as dilauroyl peroxide, diacetyl peroxide, dicaprylyl peroxide, and dimyristoyl peroxide, acid peroxides such as perbenzoic acid and succinic acid peroxide, ketone peroxides such as cyclohexanone peroxide and methyl ethyl ketone peroxide, aldehyde peroxides such as hydroxyheptyl peroxide, alkyl peroxyesters, such t-butyl peracetate, t-butyl peroxyisobutyrate, di-t-butyl diperphthalate, and t-butyl perbenzoate, and alkyl peroxides and hydroperoxides such as di-t-butyl peroxide, 2,5-dimethylhexane-2,5-dehydroperoxide, p-methane hydroperoxide and t-butyl hydroperoxides and others such as cumene hydroperoxide and dicumyl peroxide.

It is possible to classify organic peroxides as derivatives of hydrogen peroxide, H—OO—H, obtained by replacing one or both of the hydrogen atoms by organic radicals. These compounds are of the general type $R_3$—O—O—$R_4$ where $R_3$ and $R_4$ may be alkyl, arylalkyl, acyl or hydrogen.

For the purposes of our invention where the peroxide radical itself is of primary concern, we prefer to classify those peroxides where the peroxide radical is attached to a carbonyl radical adjacent to an aromatic radical as aromatic peroxides and those where the peroxide radical is attached to a carbonyl radical adjacent to an alkyl radical or to a methylene radical adjacent to an alkyl radical or an aromatic radical as alkyl peroxides.

The manner by which peroxides act as catalysts in the oxidation of phosphite esters is not known but the initial step probably involves homolytic cleavage of the

—O—O— bond in R₃—O—O—R₄ to give the free radicals R₃—O and R₄—O. These free radicals may react with the phosphites to give the desired phosphates as well as less complex free radicals which then react with oxygen to repeat the cycle, or the free radical formed initially may react with oxygen to form a free radical containing more than one oxygen which will then react with the phosphite ester to give the desired phosphate as well as the free radical formed initially which will reaction with oxygen to repeat the cycle.

The following examples are illustrative of this invention and are not to be regarded as limitative. All proportions are indicated as g. for grams and m. for moles.

*Example I*

500 g. (0.27 m.) of tri(nonylphenol + 9 E.O.) phosphite was charged to a 1-liter 4-neck flask equipped with thermometer, agitator, gas inlet and gas outlet with provisions for maintaining pressure during reaction. The phosphite was heated to 150° C. over 30 minutes in the presence of dry oxygen at atmospheric pressure and 2.5 g. (0.01 m.) of dibenzoyl peroxide as catalyst was added rapidly with agitation. The system was purged with dry oxygen to remove any air introduced during catalyst addition. The gas outlet was then closed and the oxygen pressure was increased to 50–60 mm. Hg pressure and maintained at this pressure for 14 hours. Agitation was continued throughout the reaction period. Analysis of the reaction mixture showed the theoretical amount of oxygen had reacted and the phosphite had been quantitatively oxidized to tri(nonylphenol + 9 E.O.) phosphate. Iodometric titration of the product showed the product did not contain unreacted phosphite ester and infrared spectrum that hydrolysis had not occurred during reaction.

*Example II*

As a control experiment, Example I was repeated with the exception that dibenzoyl peroxide was not added as the catalyst. Otherwise all conditions were the same. At the end of the 14 hour reaction period at 150° C. it was found by iodometric titration that only 35% of the tri (nonylphenol +9 E.O) phosphite had oxidized to the desired tri(nonylphenol + 9 E.O.) phosphate and the remaining 65% was unchanged tri(nonylphenol + 9 E.O.) phosphite. Infrared spectrum showed that hydrolysis had not occurred during reaction.

*Examle III*

A total of 500 g. (0.27 m.) of tri(nonylphenol + 9 E. O.) phosphite was charged to a 1-liter 4-neck flask equipped with thermometer, agitator, gas inlet and gas outlet. The phosphite was heated to 150° C. over 1 hour while dry air was bubbled through the liquid. When the temperature reached 150° C., 2.5 g. (0.01 m.) of dibenzoyl peroxide was added as the catalyst, and the reaction mixture was agitated at 150° C. for 20 hours while dry air was bubbled through the liquid. Analysis after 20 hours revealed the theoretical amount of oxygen had reacted to give a quantitative yield of tri(nonylphenol + 9 E.O.) phosphate. Unreacted phosphites could not be detected in the product by iodometric titration. An infrared spectrum of the product indicated that hydrolysis had not occurred during reaction.

*Example IV*

500 g. (0.29 m.) of tri(oleyl alcohol + 7 E.O.) phosphite was charged into a 1-liter 4-neck flask equipped with agitator, thermometer, gas inlet and gas outlet. The charge was heated to 100° C. over 30 minutes and 1.0 g. (0.002 m.) of dilauroyl peroxide was added as the catalyst. This mixture was bubbled with dry oxygen at 100° C. for 14 hours. Analysis of the reaction product showed that it contained no unreacted phosphite, that the theoretical quantity of oxygen had reacted, and that no hydrolysis of the tri-substituted phosphate ester had taken place.

*Example V*

A mixture of 487 g. (0.85 m.) of tri(phenol + 2 E.O.) phosphite and 25 g. (0.085 m.) of t-butylperoxybenzoate were stirred 40 hours at 25° C. under dry oxygen at 50–60 mm. Hg pressure in a 1-liter flask of the type described in Example I. Analysis of the reaction product revealed that the theoretical amount of oxygen had reacted. Iodometric analysis showed the product did not contain unreacted phosphite and infrared spectrum that hydrolysis had not occurred during reaction.

*Example VI*

A total 500 g. (0.60 m.) of tristearyl phosphite was heated to 175° C. with agitation in a flask equipped as described in Example III and 0.5 g. (0.03 m.) cumene hydroperoxide was added as the catalyst. The reaction mixture was bubbled with oxygen for 6 hours at 175° C. Analysis showed the product to be tri-stearyl phosphate. Idometric titration revealed that the product did not contain unreacted phosphites. Infrared spectrum showed that hydrolysis had not occurred during reaction.

*Example VII*

500 g. (1.95 m.) tri(methyl alcohol + 1 E.O.) phosphite was charged into a flask equipped as in Example I and heated to 75° C. in the presence of dry oxygen. When the temperature reached 75° C., 6.0 g. (0.06 m.) of 35% hydrogen peroxide was added and the reaction mixture was stirred under an oxygen pressure of 60–70 mm. Hg pressure for 14 hours. A quantitative yield of tri(methyl alcohol + 1 E.O.) phosphate was obtained. Iodometric titration showed the product contained no unreacted phosphite and infrared spectrum confirmed that no hydrolysis had occurred during reaction.

*Example VIII*

Tri(octadecylphenol + 150 E.O.) phosphate was prepared by charging 500 g. (0.024 m.) of tri-octadecylphenol + 150 E.O.) phosphite into a 1-liter flask of the type described in Example I. The phosphite was heated to 200° C. in an atmosphere of inert gas. When the reaction temperature of 200° C. was reached, the inert gas was purged rapidly with dry oxygen and 0.05 g. (0.0002 m.) of dibenzoyl peroxide was added. The reaction mixture was stirred at 200° C. under an oxygen pressure of 50–60 mm. Hg pressure for 1 hour and analyzed. It was found that the product contained no unreacted phosphites and hydrolysis had not occurred during reaction. A quantitative yield of tri(octadecylphenol + 150 E.O.) phosphate was obtained.

*Example IX*

468 g. (0.35 m.) tri(nonylphenol + 5 E.O.) phosphite and 2.5 g. (0.017 m.) of di t-butyl peroxide were charged to a 1-liter flask equipped as in Example I and heated under an oxygen pressure of 10 mm. Hg pressure to 100° C. over one hour. The reaction mixture was held at 100° C. for 1 hour. Analysis showed the theoretical amount of oxygen had reacted and the product contained no unreacted phosphites.

*Example X*

Operating as in Example I, 585 g. (0.64 m.) of tri(o-cresol + 2 Bu. O. + 1 E.O.) phosphite and 2.5 g. (0.02 m.) of perbenzoic acid were added. Analysis showed the oxidation gave a quantitative yield of tri(o-cresol + 2 Bu. O. + 1 E.O.) phosphate.

*Example XI*

A charge of 500 g. (0.177 m.) of tri(dinonylphenol + 10 Pr. O.) phosphite and 2.5 g. (0.01 m.) of dibenzoyl peroxide was added to a 1-liter flask of the type described in Example I. The charge was heated in a dry oxygen atmosphere to 150° C. over a 30 minute period. It was then stirred at 150° C. under an oxygen pressure of 50–60 mm.

Hg for 14 hours, and discharged. Analysis showed that the product did not contain unreacted phosphite or hydrolysis products and that a quantitative yield of tri(dinonylphenol + 10 Pr. O.) phosphite had been obtained.

*Example XII*

620 g. (0.65 m.) tridocosyl phosphite was charged to a 1-liter flask of the type used in Example I. The phosphite was heated to 150° C. over 1 hour in the presence of dry oxygen and 1.25 g. (0.005 m.) of dibenzoyl peroxide was added as catalyst. After the system was purged with oxygen, the oxygen pressure was increased to 50–60 mm. Hg pressure and the reaction mixture stirred at 150° C. under pressure for 14 hours. A quantitative yield of tridocosyl phosphate was obtained. The product was found not to contain any hydrolytic byproducts or unreacted phosphites.

*Example XIII*

A charge of 500 g. (0.27 m.) of tri(dichlorophenol + 10 E.O.) phosphite was heated to 150° C. in a dry oxygen atmosphere in a 1-liter flask as described in Example I and 2.5 g. (0.01 m.) of dibenzoyl peroxide was added as catalyst. The system was purged with oxygen and heated with stirring under a positive oxygen pressure of 50–60 mm. Hg pressure for 14 hours. Analysis showed the product to be free of hydrolysis byproducts and unreacted phosphites. A quantitative yield was obtained.

*Example XIV*

A total of 501 g. (1.0 m.) of ethyl phenyl (dodecylphenol + 2 E.O.) phosphite, a trisubstituted phosphite was charged to a flask equipped as in Example I and heated to 150° C. over 1 hour. 2.5 g. (0.01 m.) of dibenzoyl peroxide was added rapidly and the system was purged with dry oxygen. The oxygen pressure was adjusted to 80 mm. Hg pressure and the reaction mixture was stirred at 150° C. for 14 hours. At the end of this period the reaction product was analyzed and found to be substantially pure ethyl phenyl (dodecylphenol + 2 E.O.) phosphate. The product was free of unreacted phosphites and hydrolysis byproducts.

*Example XV*

500 g. (0.5 m.) of m-tolyl di(nonylphenol + 5 E.O.) phosphite was heated to 150° C. in a flask of the type described in Example I and 2.5 g. (0.01 m.) of dibenzoyl peroxide was added. The system was purged with dry oxygen and heated at 150° C. with agitation for 14 hours. A quantitative yield of m-tolyl di(nonylphenol + 5 E.O.) phosphate, a trisubstituted phosphate was obtained. Analysis showed the product did not contain unreacted phosphites or hydrolysis byproducts.

*Example XVI*

A charge of 500 g. (0.49 m.) of tri(dodecyl alcohol + 3.5 E.O.) phosphite, wherein the dodecyl alcohol was a synthetic alcohol mixture prepared by polymerization of ethylene with a Ziegler type catalyst and subsequent reaction of the metal alkyls formed to obtain mixtures of straight chain alcohols of the type known as Alfol 1214 (Continental Oil Company) was added to a 1-liter flask of the type described in Example I and heated to 150° C. 2.5 g. of dibenzoyl peroxide (0.01 m.) was added as the catalyst. The system was purged with dry oxygen and the oxygen pressure adjusted to 80 mm. Hg pressure. The reaction mixture was stirred at this temperature and pressure for 14 hours. Analysis showed the product to be substantially free of unreacted phosphites as well as hydrolysis byproducts. A quantitative yield was obtained.

*Example XVII*

495 g. (0.34 m.) of (lauryl alcohol + 1 E.O.) (octylphenol + 3 E.O.) (tridecylalcohol + 15 E.O.) phosphite, a trisubstituted phosphite was charged to a 1-liter flask equipped as in Example I and heated to 150° C. over 1 hour. The catalyst, 2.5 g. (0.01 m.) of dibenzoyl peroxide was added and the flask was purged with oxygen. Oxygen pressure was then adjusted to 60 mm. Hg pressure and reaction was carried out by agitating the mixture at this temperature and pressure for 14 hours. Analysis showed a quantitative yield was obtained and that the product was free of phosphites and hydrolysis byproducts.

While as stated above, the process of the present invention is particularly advantageous for production of trisubstituted phosphates from trisubstituted phosphites, it is also operable for the oxidation of monosubstituted phosphites and disubstituted phosphites of the formulae given above and their mixtures with trisubstituted phosphites as given above to obtain the corresponding phosphates and their mixtures. As examples of monosubstituted phosphites and disubstituted phosphites which may be oxidized in accordance with the present invention, there may be mentioned monodocosyl phosphite, monostearyl phosphite, mono(nonylphenol + 9 E.O.) phosphite, di(methyl alcohol + 1 E.O.) phosphite, di(nonylphenol + 5 E.O.) phosphite, and didocosyl phosphite and di-(oleyl alcohol + 7 E.O.) phosphite.

The above mentioned monosubstituted phosphites and disubstituted phosphites may be oxidized in the same manner as the trisubstituted phosphites described in greater detail in the foregoing examples.

In order to fully illustrate the oxidation of monosubstituted phosphites and disubstituted phosphites, the following specific examples are given.

*Example XVIII*

A charge of 500 g. (1.28 m.) monodocosyl phosphite and 2.5 g. (0.02 m.) dibenzoyl peroxide was added to a 1-liter flask of the type described in Example I. The charge was heated in a dry oxygen atmosphere to 150° C. over a 30 minute period. It was then stirred at 150° C. under an oxygen pressure of 50–60 mm. Hg for 14 hours and discharged. Analysis showed the product to be monodocosyl phosphate and that a quantitative yield was obtained.

*Example XIX*

A total of 500 g. (0.91 m.) of dioleyl phosphite and 2.5 g. (0.012 m.) of t-butylperoxybenzoate was charged to a flask of the type used in Example I. The phosphite was heated to 100° while dry air was bubbled through the liquid. The reaction mixture was agitated at 100° C. for 30 hours while dry air was bubbled through the liquid. Analysis showed that a quantitative yield of dioleyl phosphate was obtained.

Phosphate esters of the types produced by the process disclosed in our invention have found many commercial uses. They have found applications such as plasticizers, flame retardants, additives for petroleum products, complexing agents for inorganic salts, pigment grinding assistants, solvents, heat exchange media, antifoam agents, antistatic agents and textile lubricants. Applications for many of these phosphates have been disclosed in numerous patents and other publications.

This invention has been disclosed with respect to certain preferred embodiments. Various modifications and variations thereof will become obvious to persons skilled in the art. It is to be understood that such modifications and variations are to be included within the spirit and scope of this invention.

What is claimed is:

1. A process comprising reacting elemental oxygen with at least one phosphite ester selected from the group corresponding to the general formula:

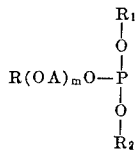

wherein R represents a member selected from the group consisting of alkyl, alkenyl and aryl, A represents alkylene containing from 2 to 4 carbon atoms and $m$ represents an integer including 0 of from from 0 to 150, $R_1$ and $R_2$ each represents a member of the group consisting of alkyl, alkenyl and aryl and the group R—(OA)—$m$ wherein R, A and $m$ are defined above, in the presence of a minor catalytic amount of a peroxide of the formula $R_3$—O—O—$R_4$, wherein $R_3$ and $R_4$ each represents a member of the group consisting of hydrogen, alkyl, arylalkyl and acyl.

2. A process as defined in claim 1 wherein said reaction is effected at a temperature of from 25° to 200° C. and wherein from 0.05 to 0.1 mole of peroxide is used per mole of phosphite.

3. A process as defined in claim 2 wherein from 0.008 to 0.1 mole of peroxide is used per mole of phosphite.

4. A process as defined in claim 2 wherein said peroxide is hydrogen peroxide.

5. A process as defined in claim 2 wherein said peroxide is an aromatic peroxide containing at least 7 carbon atoms.

6. A process defined in claim 2 wherein said peroxide is an aliphatic peroxide containing at least 5 carbon atoms.

7. A process as defined in claim 2 wherein the phosphite ester has the formula:

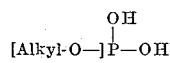

8. A process as defined in claim 2 wherein the phosphite ester has the formula:

wherein $x$ is an integer of 1 to 150.

9. A process as defined in claim 2 wherein the phosphite ester has the formula:

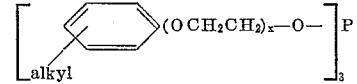

wherein $x$ is an integer from 1 to 150.

10. A process as defined in claim 2 wherein the phosphite has the formula:

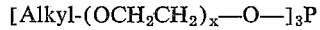

wherein $x$ is an integer of from 1 to 150.

References Cited by the Examiner
UNITED STATES PATENTS
2,059,084  10/1936  Buchheim _____ 260—461.315

OTHER REFERENCES

Emerson et al.: "J. Chem. Soc." (1962), pp. 1917–1923.

Walling et al.: "J. Am. Chem. Soc.," vol. 81, pp. 1243–1249 (1959).

Zal'Kind et al.: "Chem. Abst.," vol. 30, p. 3836 (1936).

CHARLES B. PARKER, *Primary Examiner.*

F. M. SIKORA, *Assistant Examiner.*